Oct. 6, 1925.                    H. F. LIVERMORE                    1,556,231
                                  SHUTTLE CHECK
                                 Filed July 12, 1924
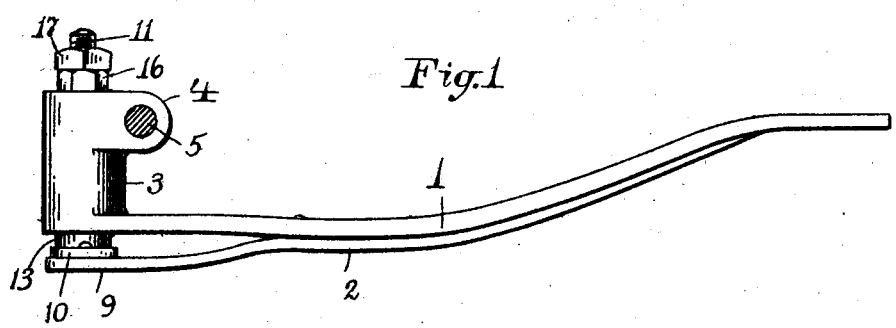
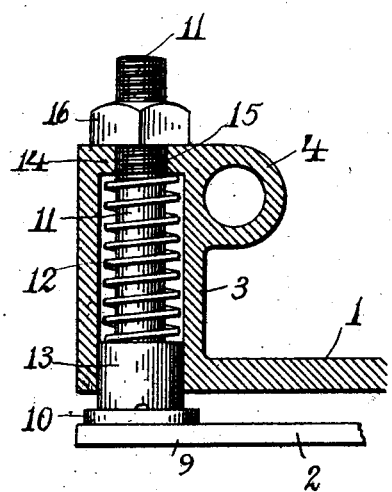   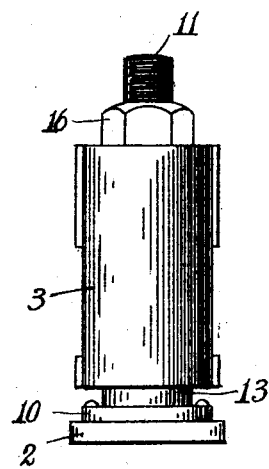
Fig. 2                              Fig. 3
Inventor,
Homer F. Livermore;
By
A. B. Upham,
Attorney.

Patented Oct. 6, 1925.

1,556,231

UNITED STATES PATENT OFFICE.

HOMER F. LIVERMORE, OF BOSTON, MASSACHUSETTS.

SHUTTLE CHECK.

Application filed July 12, 1924. Serial No. 725,563.

*To all whom it may concern:*

Be it known that I, HOMER F. LIVERMORE, a citizen of the United States, and a resident of Boston, in the county of Suffolk and Commonwealth of Massachusetts, have invented certain new and useful Improvements in Shuttle Checks, of which the following is a full, clear, and exact specification.

In a patent granted to A. T. Larin February 5, 1924, and numbered 1,482,800, for shuttle checks, in the manufacture of which I am engaged, a yieldable friction strip is attached to the inner face of the binder-bar, and has its free end supported by a helical spring designed to force this end away from the bar into the path of the shuttle. I find this somewhat impractical in use, the spring being exposed and accumulating lint and dirt, and also being incapable of convenient adjustment.

The object of this invention is the construction of a shuttle check of this general nature wherein the spring is wholly housed, and consequently incapable of accumulating dust and lint, and is also made conveniently adjustable.

In the drawings forming part of this specification. Fig. 1 is a side view, approximately half size, of a shuttle check embodying my improvements. Fig. 2 is a sectional detail view of the main portion of the same full size Fig. 3 is an end view of the shuttle check.

The binder bar 1 is in the main of substantially well known construction, having a yieldable friction strip 2 attached to its inner face. The outer end of the bar has formed thereat, or otherwise provided with, a cylindrical boss 3 at whose extremity is an eye 4 through which passes a stud 5 for the pivotal support of the bar.

The yieldable friction strip 7 has its end 9 attached to a flange 10 of a bolt 11 which passes through the cylindrical boss 3. The interior of the latter is sufficiently larger than the bolt 11 to loosely receive a helical spring 12 encircling the bolt, the spring abutting between shoulder 13 of the bolt and the opposite end 14 of the chamber of the boss. The bolt loosely fits the opening 15 of the chamber, and the shoulder or head 13 loosely fits the interior of the chamber. A nut 16 mounted on the bolt 11 exterior to the boss 3 limits the outward push given by the spring 12 to the bolt and hence to the strip 7 attached thereto. The head 13 is made long enough to permit any required degree of adjustment, or the strip 7 to accommodate the work desired.

A check nut 17 may be provided for preventing the nut 16 from becoming loosened and thereby accidentally altering the adjustment required.

As is evident, the chambered boss fully protects the spring 12 from becoming clogged with lint and dirt, and at the same time, the nuts 16 and 17 can be readily manipulated whenever any adjustment is desired for the yielding strip 7.

Although I have illustrated the invention as applied to a shuttle check of a particular form, I do not restrict myself thereto, as it is equally applicable to other forms of shuttle binders.

What I claim as my invention is:

A shuttle check for looms comprising a binder bar having a chambered boss at its outer end, said boss having an eye for receiving the pivotal stud for the bar, a bolt having a head located within and snugly slidable in said chamber, a helical spring mounted on said bolt between said head and the opposite end of the chamber, friction means attached to said head, and a nut turning on the end of said bolt exterior to the boss.

In testimony that I claim the foregoing invention, I have hereunto set my hand this 7th day of July, 1924.

HOMER F. LIVERMORE.